(12) United States Patent
Wanat

(10) Patent No.: US 7,063,283 B2
(45) Date of Patent: Jun. 20, 2006

(54) ENCLOSURE FOR FOOD PROCESSOR

(75) Inventor: David J. Wanat, Merdien, CT (US)

(73) Assignee: Conair Corporation, Stamford, CT (US)

( * ) Notice: Subject to any disclaimer, the term of this patent is extended or adjusted under 35 U.S.C. 154(b) by 189 days.

(21) Appl. No.: 10/423,833

(22) Filed: Apr. 25, 2003

(65) Prior Publication Data

US 2004/0211850 A1    Oct. 28, 2004

(51) Int. Cl.
*A47J 43/046* (2006.01)
(52) U.S. Cl. .................. 241/37.5; 241/92; 241/282.1
(58) Field of Classification Search ............ 241/37.5, 241/92, 282.1, 282.2, 199.12
See application file for complete search history.

(56) References Cited

U.S. PATENT DOCUMENTS

| | | | | |
|---|---|---|---|---|
| 2,678,073 A | * | 5/1954 | De Nardis ................ 241/92 |
| 4,199,112 A | * | 4/1980 | McLean ................... 241/92 |
| 4,226,374 A | * | 10/1980 | Kafka ..................... 241/37.5 |
| 4,397,427 A | * | 8/1983 | Howard ................... 241/30 |
| 4,458,848 A | * | 7/1984 | Williams .................. 241/92 |
| 4,458,948 A | * | 7/1984 | Ricketts ................... 299/19 |
| 4,600,155 A | * | 7/1986 | Bos et al. ................ 241/37.5 |
| 5,308,002 A | * | 5/1994 | Pereira ................... 241/92 |

* cited by examiner

*Primary Examiner*—Mark Rosenbaum
(74) *Attorney, Agent, or Firm*—Laurence Cruz; Steven A. Garner

(57) ABSTRACT

An enclosure for a food processor having a lower portion for cooperating with a control and/or operational base assembly of a food processor, a central portion for holding matter to be processed, an upper portion with one or more openings for receiving the matter into the central portion, and a safety actuator, is provided. The openings being relatively small to allow for the safe operation of the food processor without the need to close or cover said one or more openings. The openings is capable of cooperating with various accessories and/or of facilitating matter being introduced in a variety of different amounts and forms.

17 Claims, 10 Drawing Sheets

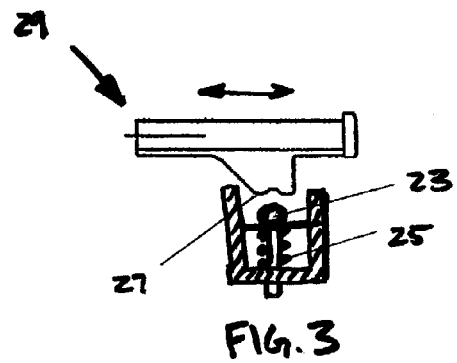
FIG. 3
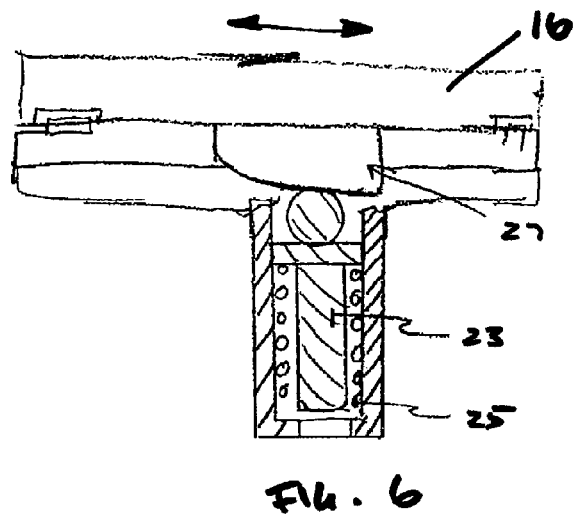
FIG. 6
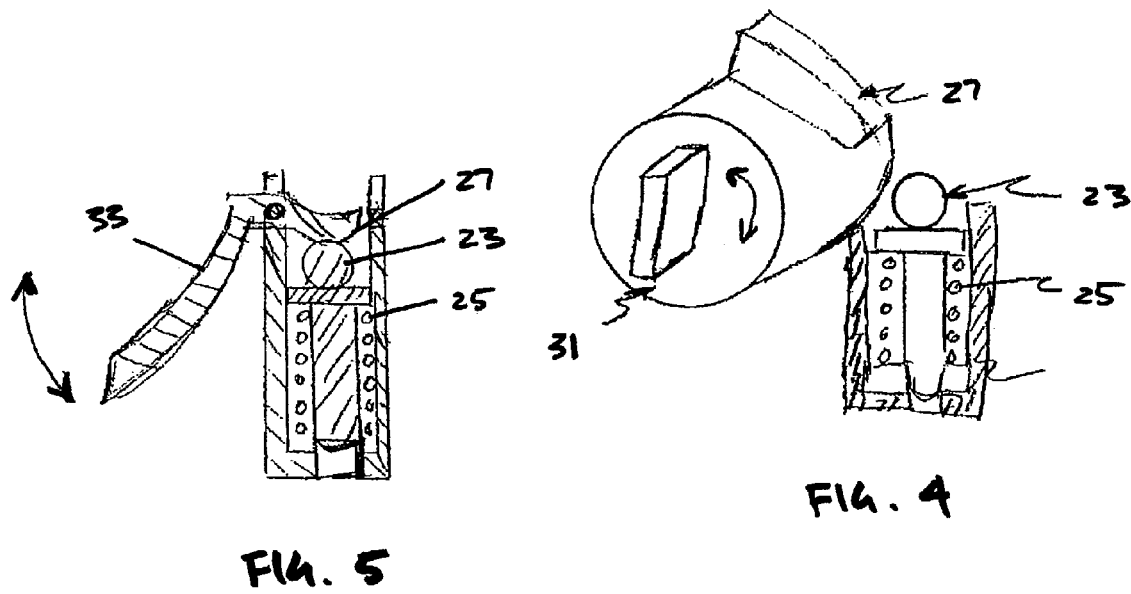
FIG. 5
FIG. 4

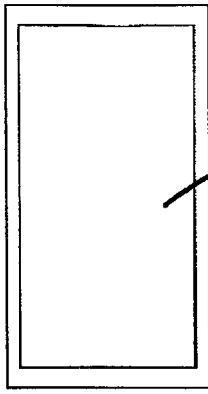
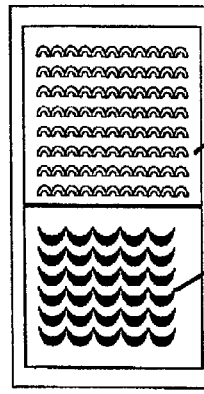
FIG. 15
FIG. 16
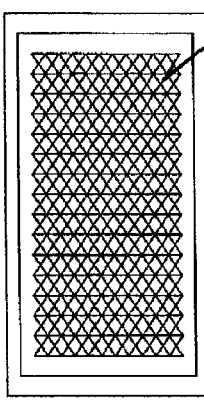
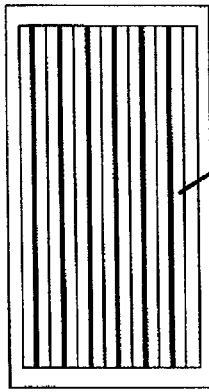
FIG. 17
FIG. 18
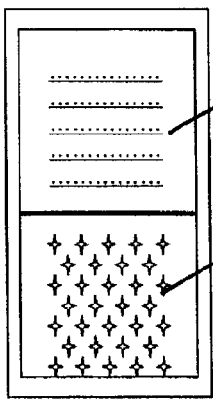
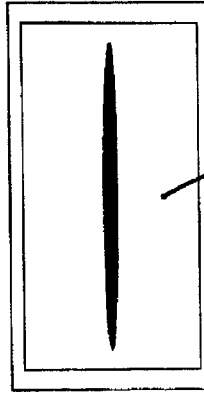
FIG. 19
FIG. 20

ENCLOSURE FOR FOOD PROCESSOR

BACKGROUND OF THE INVENTION

1. Field of the Invention

The present invention relates to food processors. More particularly, the present invention relates to an enclosure for a food processor in which the enclosure has a feed opening and a safety actuator.

2. Description of the Prior Art

Food processors providing a variety of different types of food preparations including, for example, mixing, chopping, grinding, pureeing, or liquefying are well known. Typically, these food processors have an enclosure for keeping the food that is to be prepared and for protecting against inadvertent mishaps during the preparation process. These enclosures typically have an opening in the form of a hollow tube or chute for receiving a substance into the enclosure that is to be processed. The hollow tube or chute generally extends outwardly from the enclosure at least about 4 inches or more to accommodate a larger amount of food. A pusher is typically required to cooperate with the hollow tube or chute to advance the food via a plunging or pushing action.

These conventional food processors, as described above, suffer from certain disadvantages. For example, the high profile of the typical hollow tube or chute opening occupies both work and storage space, making the device awkward and cumbersome. Further, the extra space provided by the typical hollow tube or chute opening can at times be diverse to a desired type of food preparation as it is often desirable to more closely keep or hold the substance that is to be processed. Still further, the extra cleaning necessitated as a consequence of the relatively large hollow tube or chute opening can be somewhat burdensome to a user.

Thus, it is desirable to provide an enclosure for a food processor that overcomes at least the above noted disadvantages and that further provides greater flexibility in use without compromising safety.

SUMMARY OF THE INVENTION

It is an object of the present invention to provide an enclosure for use with a food processor that overcomes at least the above identified disadvantages while at the same time providing greater flexibility in use.

It is another object of the present invention to provide an enclosure with a relatively low profile and a relatively small opening for receipt of a substance to be processed.

It is still another object of the present invention to provide an enclosure with a removable cover having a relatively low profile and a relatively small opening for receipt of a substance to be processed.

It is yet another object of the present invention to provide an enclosure with an opening forming a relatively shallow, hollow tube or chute.

It is yet still another object of the present invention to provide an enclosure with an interchangeable cover.

It is a further object of the present invention to provide an enclosure with one or more accessories cooperating with the opening.

It is still a further object of the present invention to provide an enclosure with a safety actuator.

It is yet still a further object of the present invention to provide an enclosure with an indicator for signaling a user when the safety actuator is satisfied and the food processor is ready for use.

These and other objects and advantages of the present invention are achieved by an enclosure having at least a lower portion, a central portion, and an upper portion. The lower portion for cooperating with a control and/or operational base of a food processor. The central portion for holding or keeping a substance to be processed. The upper portion having one or more openings in an upper surface thereof. The openings being in the upper surface to facilitate matter being introduced in a variety of different amounts and forms.

BRIEF DESCRIPTION OF THE DRAWINGS

Other and further objects, advantages and features of the present invention will be understood by reference to the following specification in conjunction with the accompanying drawings, in which like reference characters denote like elements of structure.

FIG. 3 is a side view of an illustrative embodiment of an actuator associated with the enclosure of FIG. 1;

FIG. 4 is a schematic and partial side sectional view of another illustrative embodiment of an actuator associated with the enclosure of FIG. 1;

FIG. 5 is a side sectional view of still another illustrative embodiment of an actuator associated with the enclosure of FIG. 1;

FIG. 6 is a side sectional view of yet still another illustrative embodiment of an actuator associated with the enclosure of FIG. 1;

FIG. 15 is a top plan view of an illustrative embodiment of an opening or an accessory part associated with the enclosure of FIG. 1;

FIG. 16 is a top plan view of another illustrative embodiment of an opening or an accessory part associated with the enclosure of FIG. 1;

FIG. 17 is a top plan view of still another illustrative embodiment of an opening or an accessory part associated with the enclosure of FIG. 1;

FIG. 18 is a top plan view of yet another illustrative embodiment of an opening or an accessory part associated with the enclosure of FIG. 1;

FIG. 19 is a top plan view of yet still another illustrative embodiment of an opening or an accessory part associated with the enclosure of FIG. 1;

FIG. 20 is a top plan view of a further illustrative embodiment of an opening or an accessory part associated with the enclosure of FIG. 1;

DETAILED DESCRIPTION OF THE INVENTION

Figure 1:
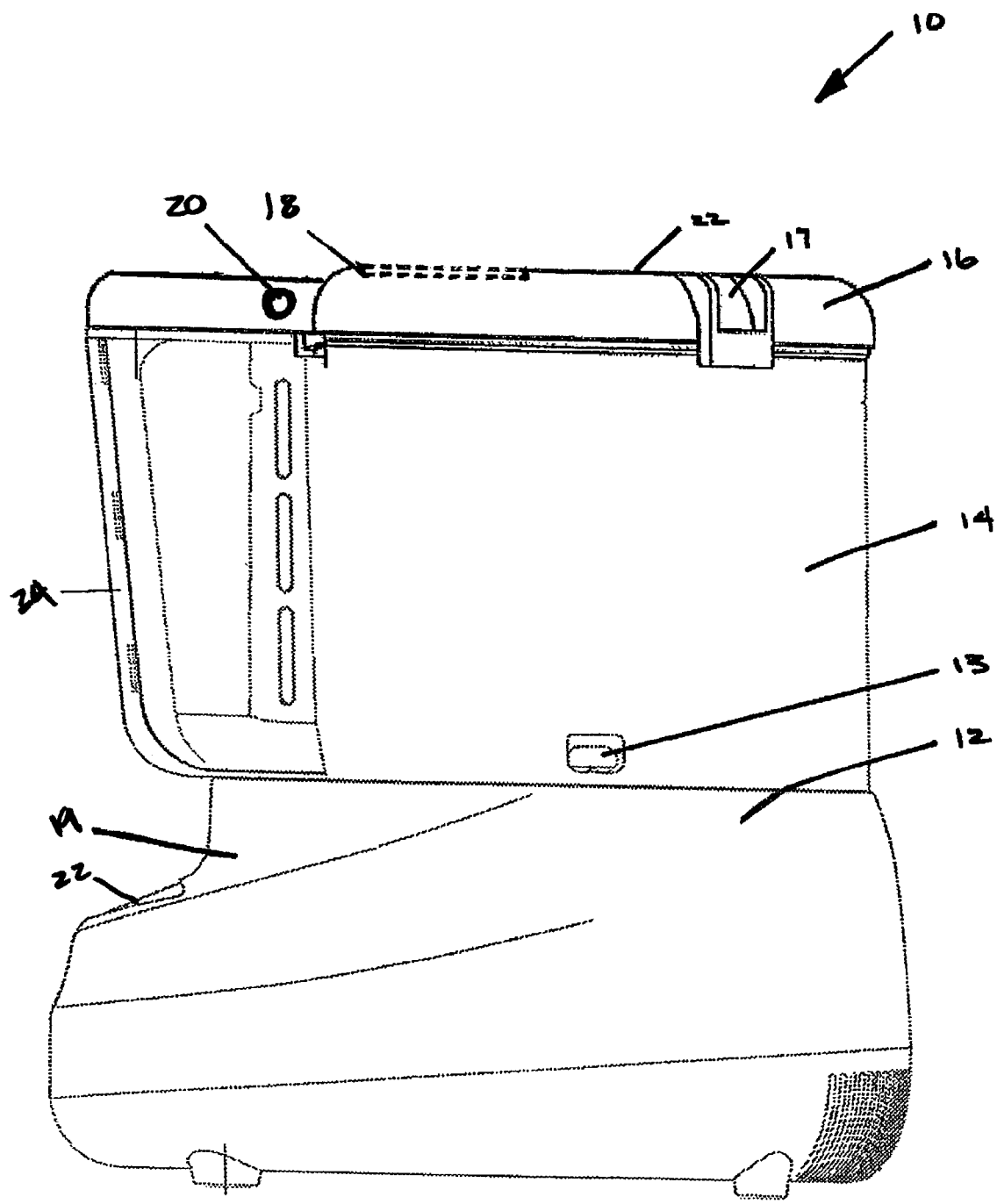
FIG. 1 is a side view of an enclosure in accordance with an illustrative embodiment of the present invention.

Referring to the drawings and, in particular, to FIG. 1, there is shown an illustrative embodiment of an improved enclosure for a food processor generally represented by reference numeral 10. The enclosure 10 essentially has a lower portion 12, a central portion 14, and an upper portion 16 with one or more openings 18. The one or more openings 18 preferably facilitate and accommodate a variety of different substances being introduced into the enclosure in a variety of different amounts and forms. In addition, enclosure 10 has or cooperates with a safety actuator 20 to improve safe operational use.

Lower portion 12 preferably cooperates with a control or operational base 19 of the food processor such that the processing of various substances can be performed in the enclosure. Preferably, control/operational base 19 houses a motor (not shown) controlled and manipulated by a control panel 22 and safety actuator 20, which will be discussed in greater detail hereinafter. Lower portion 12 can be either permanently connected to control/operational base 19 or removably mounted thereto via one or more connectors 13. It is noted that lower portion 12 can have any of a variety of forms, shapes, sizes or configurations suitable for cooperating with one or more different food processors.

Central portion 14 is preferably integral with lower portion 12. However, central portion 14 can also be separably connected to lower portion 12 in any of a variety of ways. For example, central portion 14 and lower portion 12 can be threadably engaged and threadably disengaged. Preferably, central portion 14 is of sufficient size to accommodate a wide variety of different types of substances in a variety of shapes, sizes or forms. Central portion 14 can have a handle 24. Central portion 14 can also have a safety interlock 26 (shown in FIG. 2), that includes, for example, an actuator rod 28 and a biasing spring 30. The safety interlock 26 preferably cooperates either directly or indirectly with a switch (not shown) connected with control panel 22 or the motor, or both, such that the food processor preferably operates only when the switch is activated via the safety interlock. Central portion 14 can preferably accommodate one or more removable blades (not shown) of various shapes, sizes or configurations. The blades preferably cooperate with the motor through lower portion 12. It is noted that, similar to lower portion 12, central portion can also have any of a variety of forms, shapes, or configurations suitable for cooperating with one or more different food processors and accomplishing a variety of different processing operations.

Figure 2:
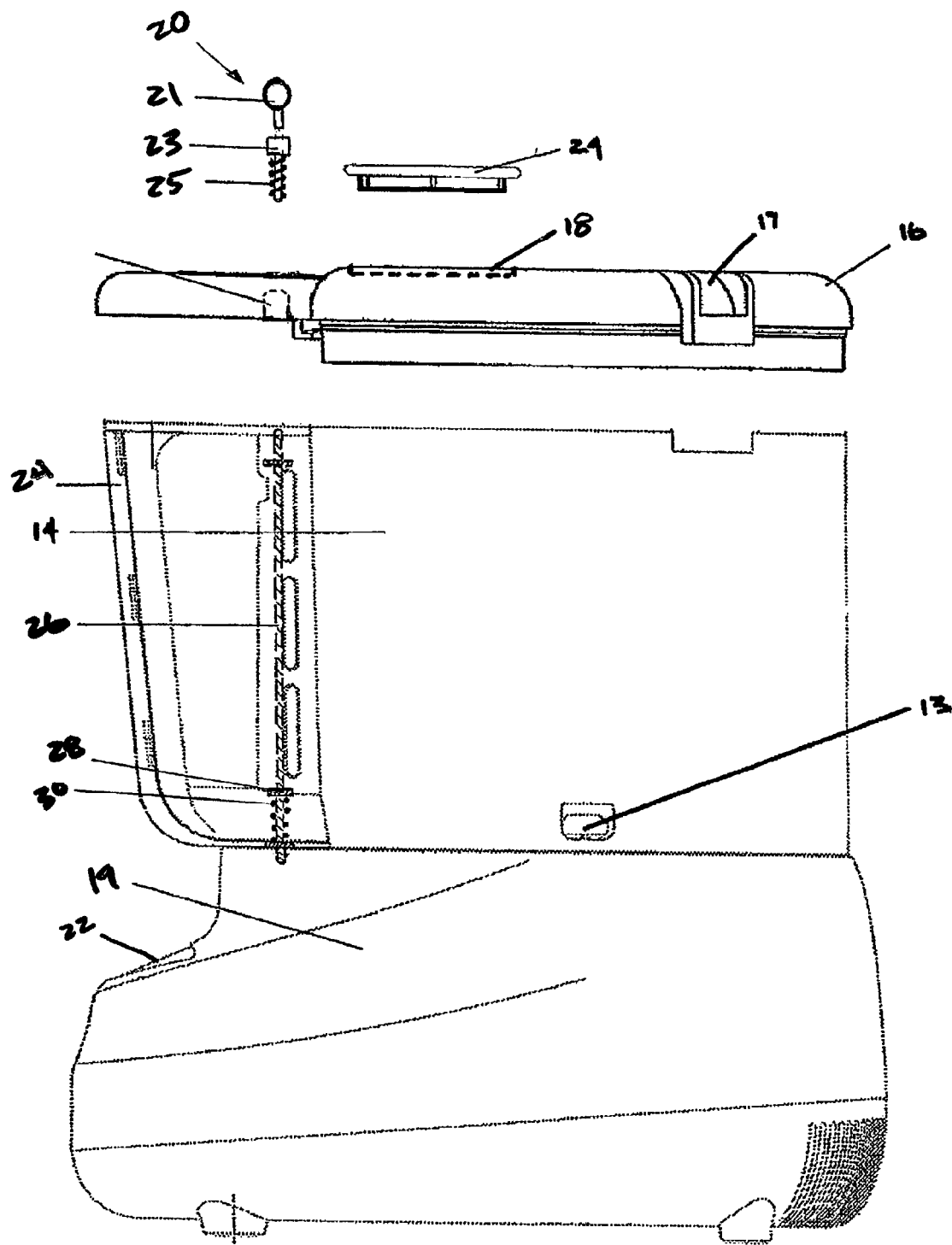
FIG. 2 is an exploded side view of the enclosure of FIG. 1.

Upper portion 16 can be integral with central portion 14. However, upper portion 16 can also preferably be separably connected with central portion 14 in any of a variety of ways. For example, upper portion 16 and central portion 14 can be threadably engaged and threadably disengaged. Also, upper portion 16 can be removably mounted to central portion 14 via one or more connectors 17. Upper portion 16 can also have a safety actuator 20, having, for example as shown in FIG. 2, a cam 21, a rod 23 and a spring 25. Safety actuator 20 can preferably cooperate either directly or indirectly with the switch (not shown) connected with control panel 22 or the motor, or both, such that the food processor preferably operates only when the switch is activated via the safety actuator. It is noted that safety actuator 20 can have any configuration suitable for accomplishing the aforementioned switch activation. For example, safety actuator can be a mechanical type device, a sensor type device, an electrical type device or any combination of the same.

Referring to FIG. 2, preferably cam 21, rod 23, and spring 25 cooperate such that when cam 21 is caused to act on rod 23, the bias of spring 25 is overcome and rod 23 is caused to either directly or indirectly activate the switch, which switch activation, as stated above, allows the food processor to operate. It is noted that cam 21 can have any of a variety of forms or configurations suitable for accomplishing the aforementioned switch activation. For example, cam 21 can be a sliding rod 29, as shown in FIG. 3, with a fin having a corrugated cam surface 27 for interacting with rod 23. In this embodiment when sliding rod 29 is slid, corrugated cam surface 27 acts on rod 23 to cause it to move in opposing directions as a function of the positioning the rod in relation to the corrugations of the cam surface. Cam 21 can also be a rotating knob 31, as shown in FIG. 4, with a tapered cam surface 27 for interaction with rod 23 such that when rotating knob 31 is rotated tapered cam surface 27 acts on the rod to cause it to move in opposing directions as a function of the positioning of rod 23 in relation to the taper of the cam surface. Cam 21 can also be a lever 33, as shown in FIG. 5, for interacting with rod 23 such that when lever 33 is pivoted, the rod is caused to move in opposing directions as a function of the positioning of the lever.

Further, cam 21 can also be integral with upper portion 16, as shown in FIG. 6, with a tapered cam surface 27 for interaction with rod 23. Thus, when upper portion 16 is properly positioned tapered cam surface 27 acts on rod 23 to cause it to move in opposing directions as a function of the positioning of the rod in relation to the taper of the cam surface. It should be recognized that the actuator and/or any of the components thereof can be of any form suitable to accomplish the above stated switch actuation.

Referring generally to FIGS. 7 through 14, there is shown a number of illustrative embodiments demonstrating various enclosure embodiments that are clearly within the scope of the present invention. Other like configurations, suitable to accomplish the above stated objectives of the present invention, may also be used.

Figure 7:
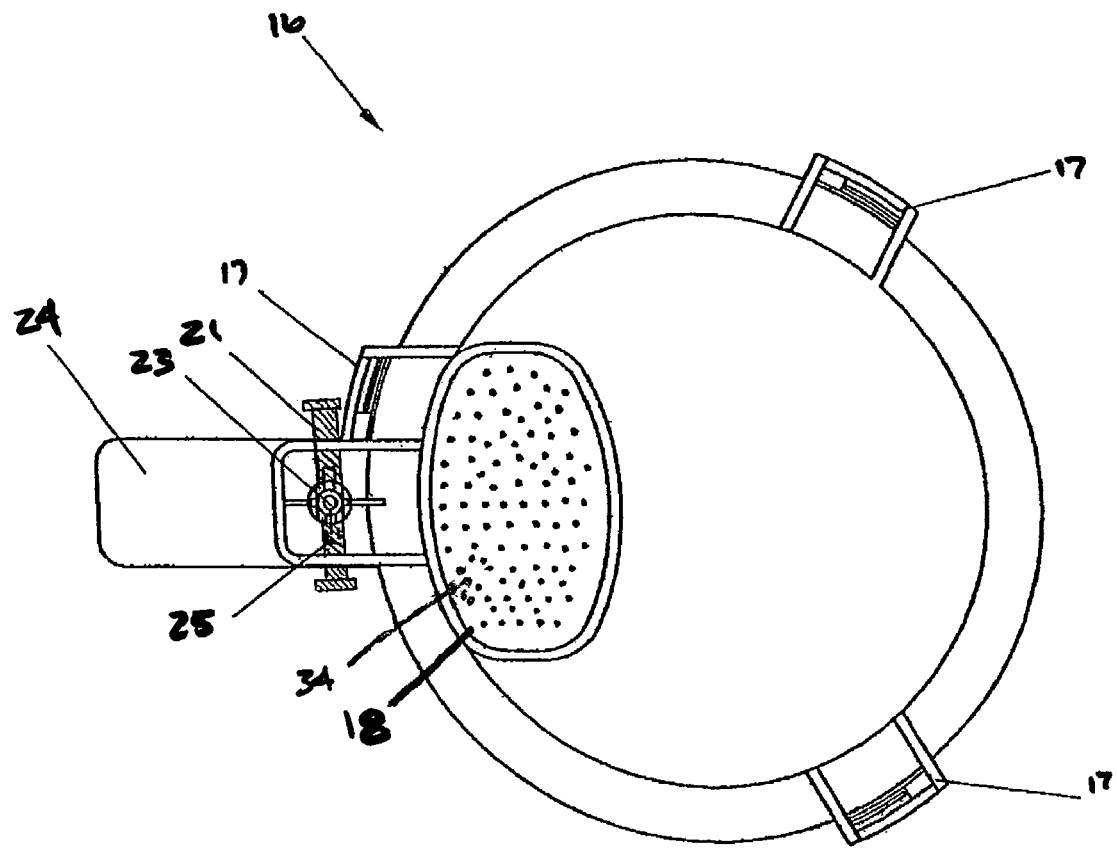
FIG. 7 is a top plan view of an illustrative embodiment of the enclosure of FIG. 1.
Figure 8:
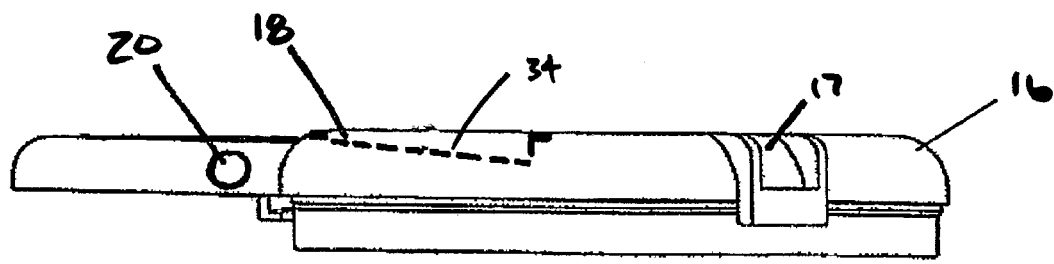
FIG. 8 is a side view of an upper portion of the illustrative embodiment of FIG. 7.

Referring to FIGS. 7 and 8, for example, one or more openings 18 are formed directly in upper portion 16. One or more openings 18 are preferably relatively small to allow for the safe operation of the food processor without the need to close the openings. Preferably one or more openings 18 are of sufficient relative size to accommodate a wide array of different types of substances while preventing access by a user's hand. Also, one or more openings can have an inner rim or shield (not shown) to reduce or eliminate any debris from escaping the enclosure during operational use.

One or more openings 18 can be of various different sizes, shapes or configurations suitable for accomplishing a variety of different preliminary preparations to a substance prior to any processing via the food processor. For example, one or more openings 18 can have the form of at least any of the configurations shown in FIGS. 15 through 34, including a grating surface, a sifting surface, a funnel, a cup, a surface with at least one of the one or more openings being of variable size, a surface with one or more openings 18 being differently sized, or any other like configuration, and any combination of the same.

One or more openings 18 of upper portion 16 can also cooperate with a variety of different accessories 32 to provide even further flexibility in the use of the food processor. Accessories 32 can preferably be any of a variety of different shapes, sizes or configurations suitable for complimenting or facilitating a variety of different preliminary processing operations or preparations.

Figure 9:
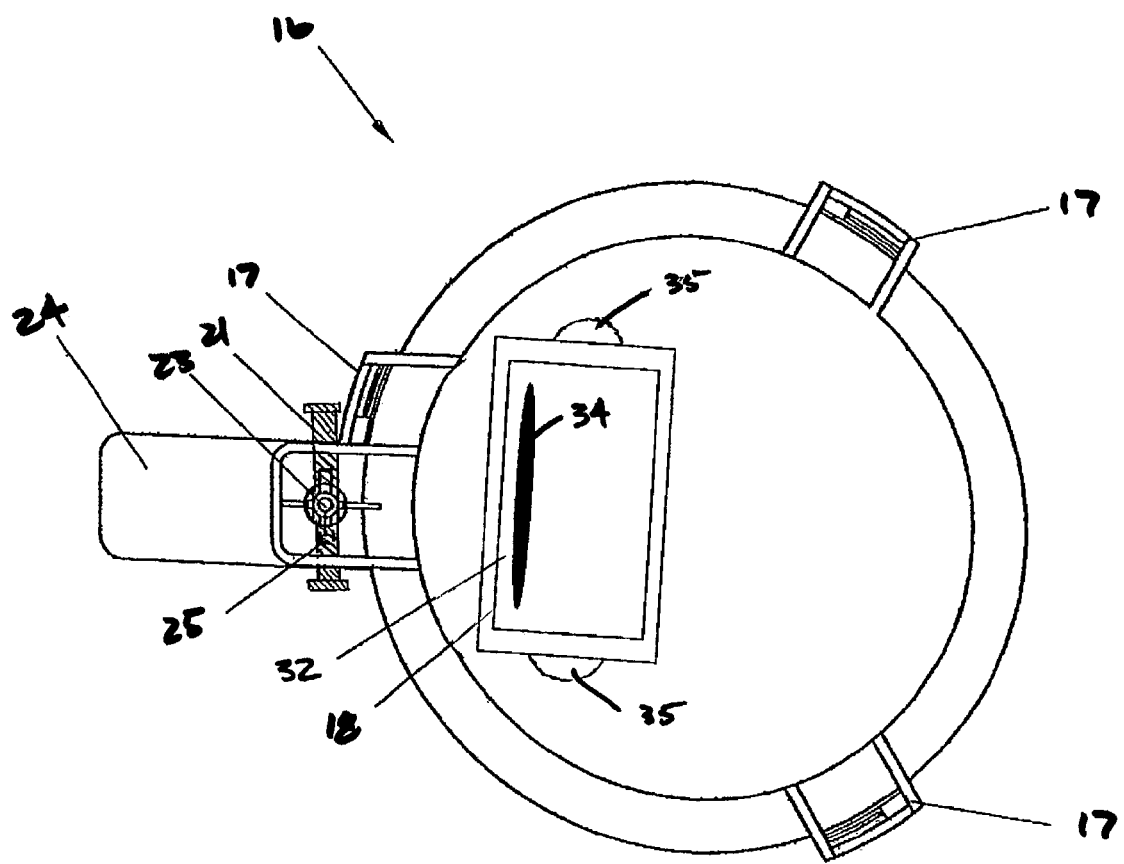
FIG. 9 is a top plan view of another illustrative embodiment of the enclosure of FIG. 1.
Figure 10:
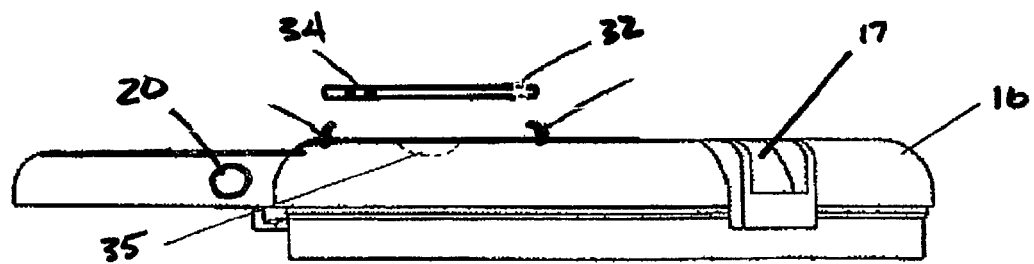
FIG. 10 is a side view of an upper portion of the illustrative embodiment of FIG. 9.

Referring to FIGS. 9 and 10, for example, accessories 32 can be in the form of a flat plate 32 with at least any of the configurations shown in FIGS. 15 through 34, including a surface with one or more apertures, a grating surface, a sifting surface, a surface with at least one of the one or more openings being of variable size, a surface with one or more apertures 34 being differently sized, or any other like configuration, and/or any combination of the same. Preferably, flat plate 32 can also be reversible with different surface configurations on either side thereof. Flat plate 32 can be annular in the form of a disc 32. Preferably, disc 32 can be rotated about an axis that is preferably normal or perpendicular to the surface thereof. Preferably, disc 32 can likewise have one or more apertures, a grating surface, a sifting surface, a surface with at least one of the one or more openings being of variable size, a surface with one or more apertures 34 being differently sized, or any other like configuration, or any combination of the same. Also, disc 32 can be reversible with different surface configurations on either side thereof.

Figure 11:
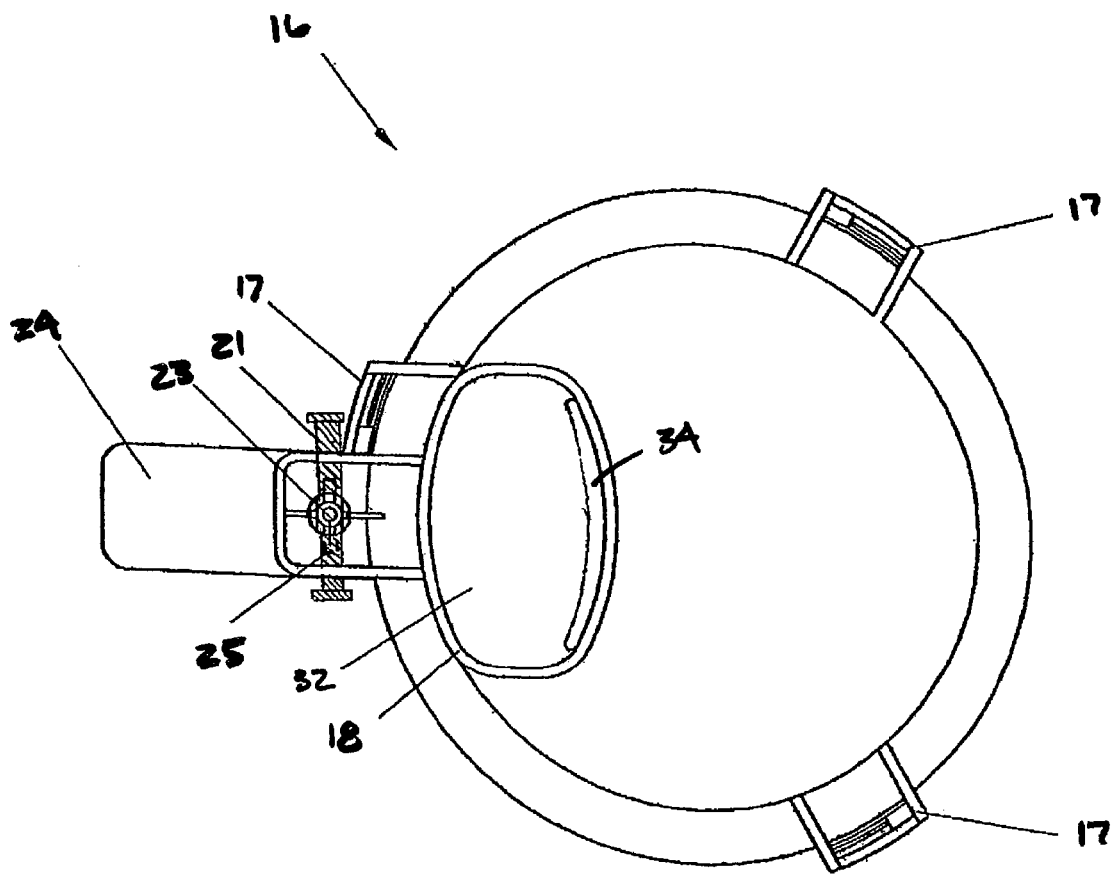
FIG. 11 is a top plan view of still another illustrative embodiment of the enclosure of FIG. 1.
Figure 12:
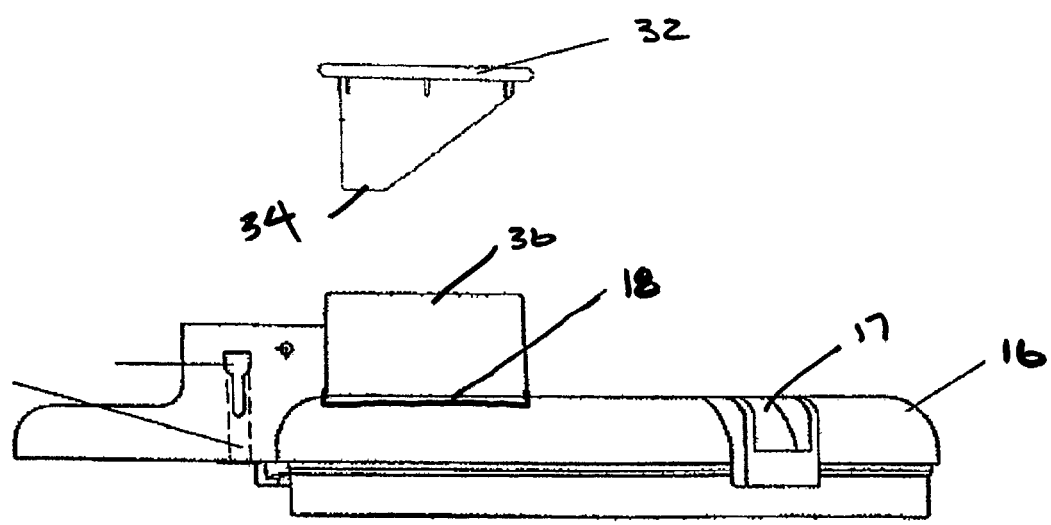
FIG. 12 is a side view of an upper portion of the illustrative embodiment of FIG. 11.
Figure 13:
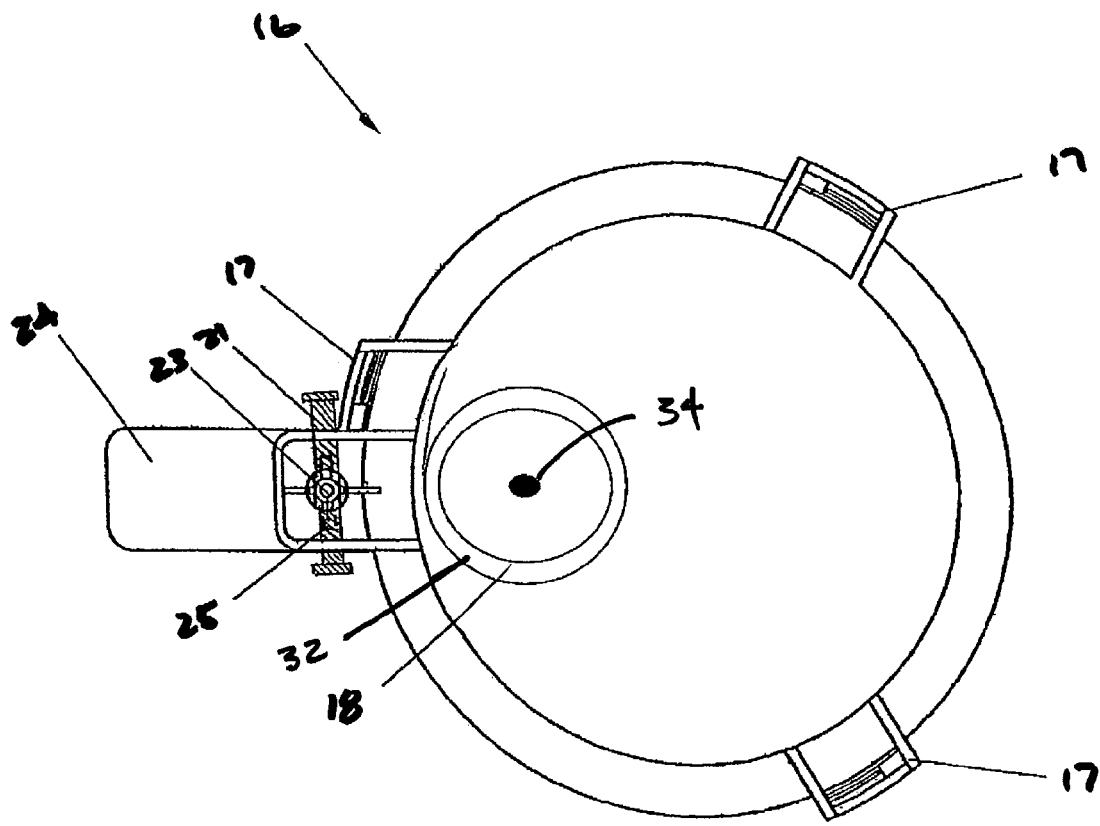
FIG. 13 is a top plan view of yet another illustrative embodiment of the enclosure of FIG. 1.
Figure 14:
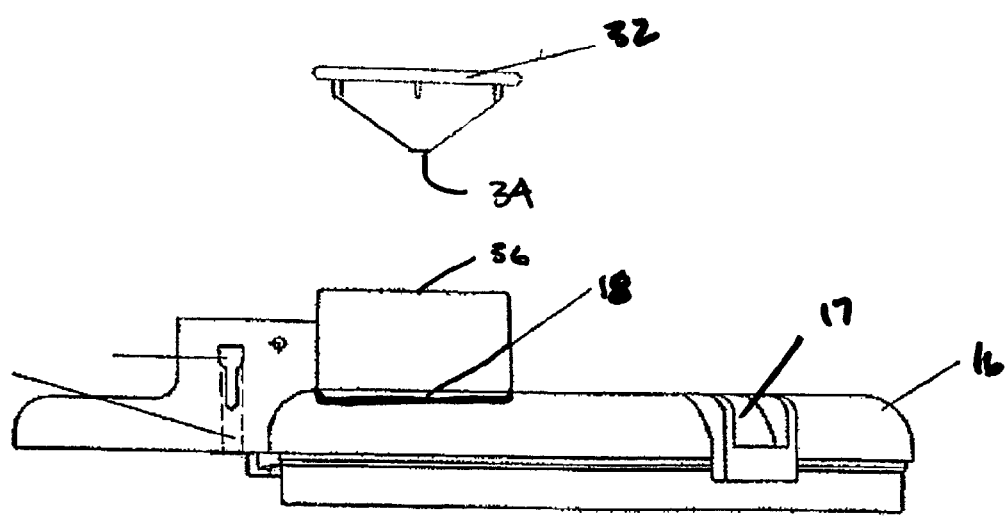
FIG. 14 is a top plan view of an upper portion of the illustrative embodiment of FIG. 13.
Figure 21:
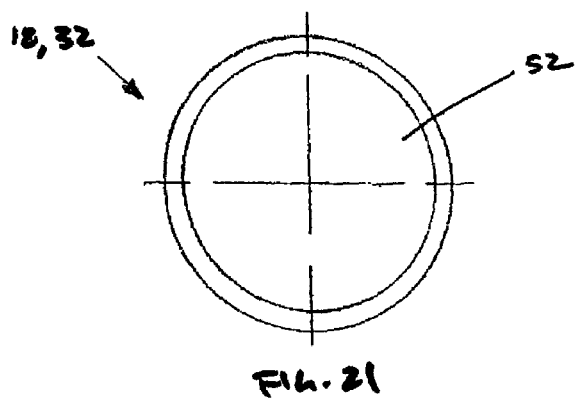
FIG. 21 is a top plan view of an illustrative embodiment of an opening or an accessory part associated with the enclosure of FIG. 1.
Figure 22:
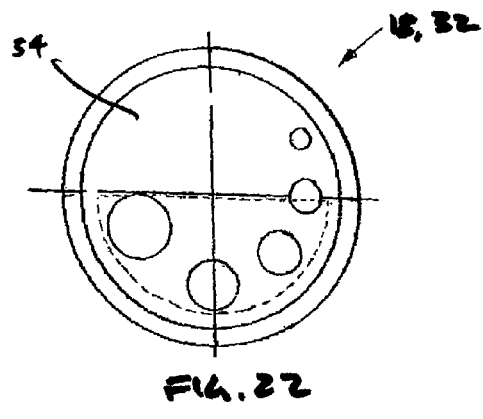
FIG. 22 is a top plan view of another illustrative embodiment of an opening or an accessory part associated with the enclosure of FIG. 1.
Figure 23:
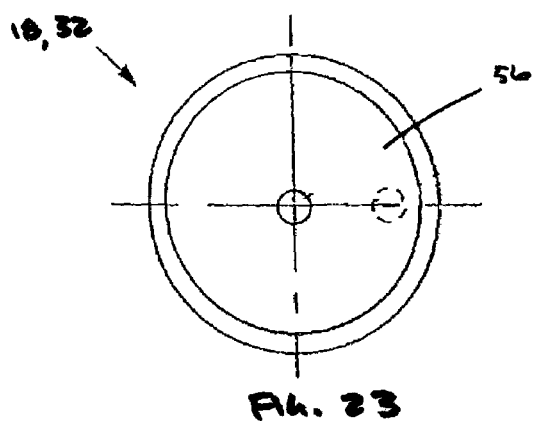
FIG. 23 is a top plan view of still another illustrative embodiment of an opening or an accessory part associated with the enclosure of FIG. 1.
Figure 24:
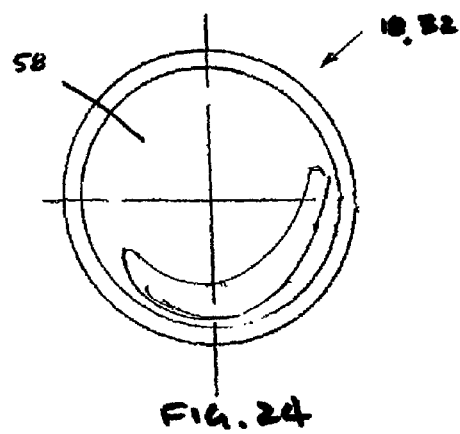
FIG. 24 top plan is a plan view of yet another illustrative embodiment of an opening or an accessory part associated with the enclosure of FIG. 1.
Figure 25:
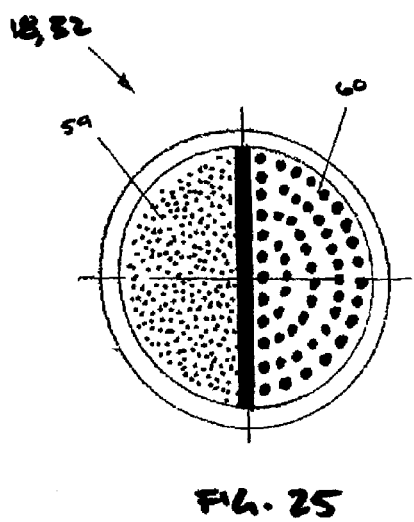
FIG. 25 is a top plan view of yet still another illustrative embodiment of an opening or an accessory part associated with the enclosure of FIG. 1.
Figure 26:
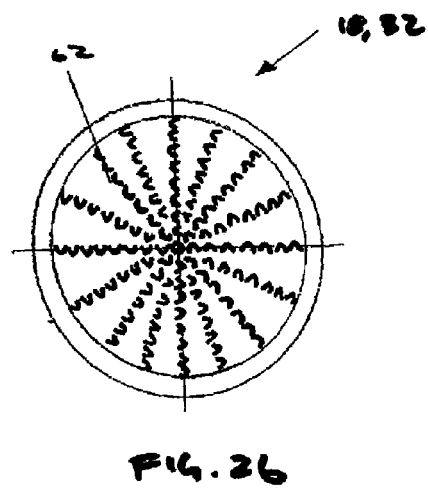
FIG. 26 is a top plan view of a further illustrative embodiment of an opening or an accessory part associated with the enclosure of FIG. 1.
Figure 27:
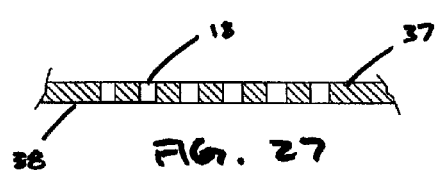
FIG. 27 is a side section view of an illustrative embodiment of an opening or an accessory part associated with the enclosure of FIG. 1.
Figure 28:
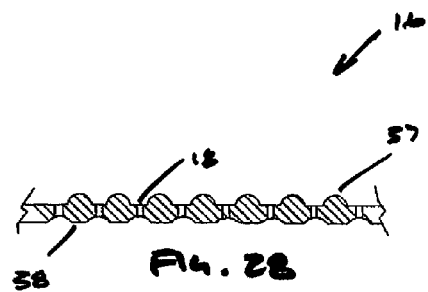
FIG. 28 is a side section view of another illustrative embodiment of an opening or an accessory part associated with the enclosure of FIG. 1.
Figure 29:
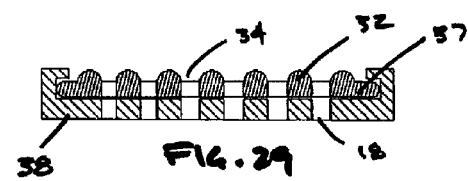
FIG. 29 is a side section view of still another illustrative embodiment of an opening and an accessory part associated with the enclosure of FIG. 1.
Figure 30:
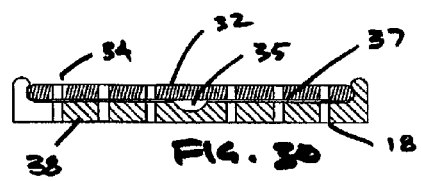
FIG. 30 is a side section view of yet another illustrative embodiment of an opening and an accessory part associated with the enclosure of FIG. 1.
Figure 31:
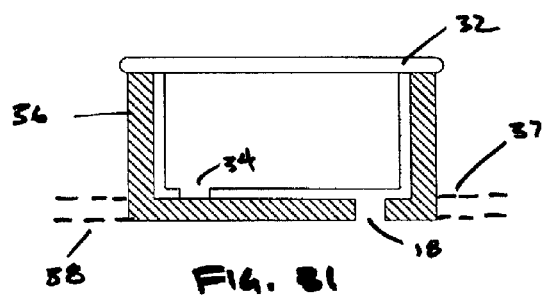
FIG. 31 is a side section view of yet still another illustrative embodiment of an opening and an accessory part associated with the enclosure of FIG. 1.
Figure 32:
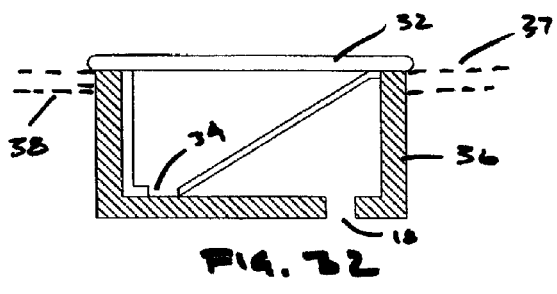
FIG. 32 is a side section view of a further illustrative embodiment of an opening and an accessory part associated with the enclosure of FIG. 1.
Figure 33:
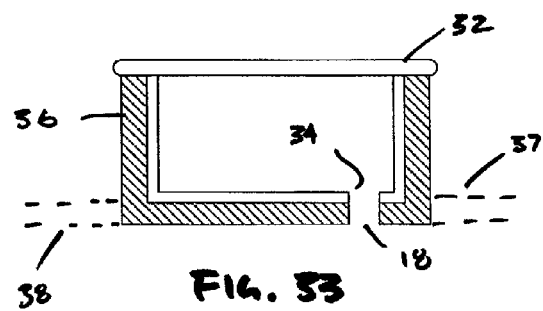
FIG. 33 is a side section view of yet still another illustrative embodiment of an opening and an accessory part associated with the enclosure of FIG. 1.
Figure 34:
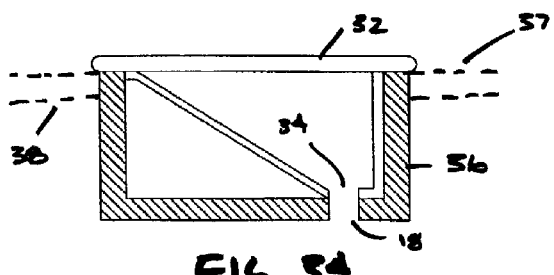
FIG. 34 is a side section view of a further illustrative embodiment of an opening and an accessory part associated with the enclosure of FIG. 1.

Referring to FIGS. 11 and 14, for example, accessories 32 can be in the form of a cup, a funnel or an annular cone having at least any of the configurations shown in FIGS. 15 through 34, including a surface with one or more apertures, a grating surface, a sifting surface, a surface with at least one of the one or more openings being of variable size, a surface with one or more apertures 34 being differently sized, or any other like configuration, or any combination of the same. Preferably, cup, funnel and annular cone can be rotated about an axis that is preferably normal or perpendicular to a base thereof. Also, cup, funnel and annular cone can facilitate the measuring of the substance to be processed. Further, one or more openings 18 can form a hollow tube or chute 36 extending from upper portion 16. Hollow tube or chute 36 can preferably either extend from an upper outer surface 37 of upper portion 16 or from an inner lower surface 38 of upper portion and can preferably cooperate with accessories 32. Hollow tube or chute 36 can have a relatively low profile of preferably less than about 4 inches. Hollow tube or chute 36 can also be adjustable. For example, hollow tube or chute 36 can be raised and/or lowered telescopically. Hollow tube or chute 36 can also be adjusted via accessories 32.

The present invention having been thus described with particular reference to the preferred forms thereof, it will be obvious that various changes and modifications may be made therein without departing from the spirit and scope of the present invention as defined herein.

What is claimed is:

1. An enclosure for a food processor, comprising:
   a lower portion for cooperating with a control and/or operational base assembly of a food processor;
   a central portion for holding matter to be processed: and
   an upper portion with one or more openings formed in said upper portion for receiving said matter into said central portion,
   wherein said one or more openings have a sufficiently small area relative to said upper portion to allow for the food processor to operate safely without the need to close or cover said one or more openings, wherein said one or more openings have a grating surface.

2. An enclosure for a food processor, comprising:
   a lower portion for cooperating with a control and/or operational base assembly of a food processor;
   a central portion for holding matter to be processed; and
   an upper portion with one or more openings formed in said upper portion for receiving said matter into said central portion,
   wherein said one or more openings have a sufficiently small area relative to said upper portion to allow for the food processor to operate safely without the need to close or cover said one or more openings, wherein said one or more openings are formed in a sift portion of said upper surface.

3. An enclosure for a food processor, comprising:
   a lower portion for cooperating with a control and/or operational base assembly of a food processor:
   a central portion for holding matter to be processed; and
   an upper portion with one or more openings formed in said upper portion for receiving said matter into said central portion,
   wherein said one or more openings have a sufficiently small area relative to said upper portion to allow for the food processor to operate safely without the need to close or cover said one or more openings, wherein said one or more openings cooperate with one or more accessories and wherein said one or more accessories have a grating portion with at least one aperture.

4. An enclosure for a food processor, comprising:
   a lower portion for cooperating with a control and/or operational base assembly of a food processor;
   a central portion for holding matter to be processed; and an upper portion with one or more openings formed in said upper portion for receiving said matter into said central portion, wherein said one or more openings have a sufficiently small area relative to said upper portion to allow for the food processor to operate safely without the need to close or cover said one or more openings, wherein said one or more openings cooperate with one or more accessories and wherein said one or more accessories have an aperture variable in size, shape, or both.

5. An enclosure for a food processor, comprising:

a lower portion for cooperating with a control and/or operational base assembly of a food processor;

a central portion for holding matter to be processed; and an upper portion with one or more openings formed in said upper portion for receiving said matter into said central portion, wherein said one or more openings have a sufficiently small area relative to said upper portion to allow for the food processor to operate safely without the need to close or cover said one or more openings, wherein said one or more openings cooperate with one or more accessories and wherein said one or more accessories are in the form selected from the group consisting of a flat plate, a flat plate with one or more apertures, a flat plate with a grating portion, a reversible flat plate with different surface configurations on either side thereof, a flat plate with a sifting portion, and any combinations thereof.

6. An enclosure for a food processor, comprising:

a lower portion for cooperating with a control and/or operational base assembly of a food processor;

a central portion for holding matter to be processed; and an upper portion with one or more openings formed in said upper portion for receiving said matter into said central portion, wherein said one or more openings have a sufficiently small area relative to said upper portion to allow for the food processor to operate safely without the need to close or cover said one or more openings, wherein said one or more openings cooperate with one or more accessories and wherein said one or more accessories are in the form selected from the group consisting of a funnel, a funnel with one or more apertures, a funnel with a sifting portion, a funnel with a grating portion and any combinations thereof.

7. An enclosure for a food processor, comprising:

a lower portion for cooperating with a control and/or operational base assembly of a food processor;

a central portion for holding matter to be processed; and an upper portion with one or more openings formed in said upper portion for receiving said matter into said central portion, wherein said one or more openings have a sufficiently small area relative to said upper portion to allow for the food processor to operate safely without the need to close or cover said one or more openings, wherein said one or more openings cooperate with one or more accessories and wherein said one or more accessories are in the form selected from the group consisting of a disc, a disc with one or more apertures, a disc with a grating portion, a reversible disc with differing surface configurations on either side thereof, a disc with a sifting portion, a rotating disc with one or more apertures, a rotating disc with an array of apertures, a rotating disc with at least two apertures of differing size, a rotating disc with at least one aperture of varying size, and any combinations thereof.

8. An enclosure for a food processor, comprising:

a lower portion for cooperating with a control and/or operational base assembly of a food processor;

a central portion for holding matter to be processed; and an upper portion with one or more openings formed in said upper portion for receiving said matter into said central portion, wherein said one or more openings have a sufficiently small area relative to said upper portion to allow for the food processor to operate safely without the need to close or cover said one or more openings, wherein said one or more openings cooperate with one or more accessories and wherein said one or more accessories are in the form selected from the group consisting of an annular cone, an annular cone with one or more apertures, a rotating an annular cone with an array of apertures, an annular cone with a sifting portion, an annular cone with a grating portion, a rotating annular cone with at least two apertures of differing size, a rotating annular cone with at least one aperture of varying size, and any combinations thereof.

9. An enclosure for a food processor, comprising:

a lower portion for cooperating with a control and/or operational base assembly of a food processor;

a central portion for retaining matter to be processed;

an upper portion with one or more openings for receiving said matter into said central portion, said one or more openings forming a hollow tube or chute with a relatively low profile, wherein said tube or chute extends from said upper portion less than about 4 inches, wherein said one or more openings have a grating surface.

10. An enclosure for a food processor, comprising:

a lower portion for cooperating with a control and/or operational base assembly of a food processor;

a central portion for holding matter to be processed; and an upper portion with one or more openings for receiving said matter into said central portion, wherein said one or more openings have a sufficiently small area relative to said upper portion to allow for the food processor to operate safely without the need to close or cover said one or more openings, and wherein said one or more openings cooperate with one or more accessories, and said one or more accessories have one or more apertures.

11. The enclosure of claim 10, wherein at least two of said one or more apertures are of differing size.

12. The enclosure of claim 10, wherein said one or more accessories are in the form selected from the group consisting of a flat plate, a flat plate with one or more apertures, a flat plate with a grating portion, a reversible flat plate with different surface configurations on either side thereof, a flat plate with a sifting portion, a funnel, a funnel with one or more apertures, a funnel with a sifting portion, a funnel with a grating portion a disc, a disc with one or more apertures, a disc with a grating portion, a reversible disc with differing surface configurations on either side thereof, a disc with a sifting portion, a rotating disc with one or more apertures, a rotating disc with an array of apertures, a rotating disc with at least two apertures of differing size, a rotating disc with at least one aperture of varying size, an annular cone, an annular cone with one or more apertures, a rotating an annular cone with an array of apertures, an annular cone with a sifting portion, an annular cone with a grating portion, a rotating an annular cone with at least two apertures of differing size, a rotating an annular cone with at least one aperture of varying size, and any combinations thereof.

13. An enclosure for a food processor, comprising:
a lower portion for cooperating with a control and/or operational base assembly of a food processor;
a central portion for retaining matter to be processed; and
an upper portion with one or more openings for receiving said matter into said central portion, said one or more openings forming a hollow tube or chute with a relatively low profile,
wherein said tube or chute extends from said upper portion less than about 4 inches, and
wherein said one or more openings cooperate with one or more accessories and said one or more accessories have one or more apertures.

14. The enclosure of claim 13, wherein at least two of said one or more apertures are of differing size.

15. The enclosure of claim 13, wherein said one or more accessories have a grating portion with at least one aperture.

16. The enclosure of claim 13, wherein said one or more accessories have an aperture variable in size, shape, or both.

17. The enclosure of claim 13, wherein said one or more accessories are in the form selected from the group consisting of a flat plate, a flat plate with one or more apertures, a flat plate with a grating portion, a reversible flat plate with different surface configurations on either side thereof, a flat plate with a sifting portion, a funnel, a funnel with one or more apertures, a funnel with a sifting portion, a funnel with a grating portion, a disc, a disc with one or more apertures, a disc with a grating portion, a reversible disc with differing surface configurations on either side-thereof, a disc with a sifting portion, a rotating disc with one or more apertures, a rotating disc with an array of apertures, a rotating disc with at least two apertures of differing size, a rotating disc with at least one aperture of varying size, an annular cone, an annular cone with one or more apertures, a rotating an annular cone with an array of apertures, an annular cone with a sifting portion, an annular cone with a grating portion, a rotating an annular cone with at least two apertures of differing size, a rotating an annular cone with at least one aperture of varying size, and any combinations thereof.

* * * * *